(12) United States Patent
Jin et al.

(10) Patent No.: US 8,872,928 B2
(45) Date of Patent: Oct. 28, 2014

(54) METHODS AND APPARATUS FOR SUBSPACE VIDEO STABILIZATION

(75) Inventors: Hailin Jin, San Jose, CA (US); Aseem O. Agarwala, Seattle, WA (US); Jue Wang, Kenmore, WA (US); Michael L. Gleicher, Madison, WI (US); Feng Liu, Portland, OR (US)

(73) Assignee: Adobe Systems Incorporated, San Jose, CA (US)

( * ) Notice: Subject to any disclaimer, the term of this patent is extended or adjusted under 35 U.S.C. 154(b) by 847 days.

(21) Appl. No.: 12/953,703

(22) Filed: Nov. 24, 2010

(65) Prior Publication Data

US 2013/0120600 A1    May 16, 2013

Related U.S. Application Data

(60) Provisional application No. 61/382,822, filed on Sep. 14, 2010.

(51) Int. Cl.
| | |
|---|---|
| H04N 5/228 | (2006.01) |
| H04N 5/232 | (2006.01) |
| G06T 7/20 | (2006.01) |

(52) U.S. Cl.
CPC ............ *G06T 7/206* (2013.01); *H04N 5/23267* (2013.01); *H04N 5/23254* (2013.01)
USPC ..................................................... 348/208.4

(58) Field of Classification Search
CPC ... G06T 5/003; G06T 7/2033; H04N 5/23254
USPC ................................................ 348/46, 208.4
See application file for complete search history.

(56) References Cited

U.S. PATENT DOCUMENTS

| | | | |
|---|---|---|---|
| 7,424,150 B2 * | 9/2008 | Cooper et al. | 382/173 |
| 7,978,925 B1 * | 7/2011 | Souchard | 382/254 |
| 2008/0112642 A1 | 5/2008 | Matsushita et al. | |
| 2009/0278921 A1 * | 11/2009 | Wilson | 348/77 |
| 2009/0285544 A1 | 11/2009 | Fitzgibbon et al. | |
| 2010/0026712 A1 | 2/2010 | Aliprandi et al. | |
| 2010/0046843 A1 | 2/2010 | Ma et al. | |
| 2010/0053347 A1 | 3/2010 | Agarwala | |
| 2013/0128121 A1 | 5/2013 | Agarwala et al. | |

OTHER PUBLICATIONS

Tomasi et al. (Kluwer Academic Publishers International Journal of Computer Vision, 9:2, 137-154 (1992).*
"Non-Final Office Action", U.S. Appl. No. 12/954,445, (Mar. 6, 2013), 7 pages.

(Continued)

*Primary Examiner* — William C Vaughn, Jr.
*Assistant Examiner* — Naod Belai
(74) *Attorney, Agent, or Firm* — Wolfe-SBMC

(57) ABSTRACT

Methods, apparatus, and computer-readable storage media for subspace video stabilization. A subspace video stabilization technique may provide a robust and efficient approach to video stabilization that achieves high-quality camera motion for a wide range of videos. The technique may transform a set of input two-dimensional (2D) motion trajectories so that they are both smooth and resemble visually plausible views of the imaged scene; this may be achieved by enforcing subspace constraints on feature trajectories while smoothing them. The technique may assemble tracked features in the video into a trajectory matrix, factor the trajectory matrix into two low-rank matrices, and perform filtering or curve fitting in a low-dimensional linear space. The technique may employ a moving factorization technique that is both efficient and streamable.

19 Claims, 7 Drawing Sheets

(56) References Cited

OTHER PUBLICATIONS

"U.S. Application as Filed", U.S. Appl. No. 12/953,703, (Nov. 24, 2010), 53 pages.

Agarwala, Aseem et al., "Keyframe-Based Tracking for Rotoscoping and Animation", *SIGGRAPH '04*, (2004), 8 pages.

Agarwala, et al., "Interactive digital photomontage", *ACM Transactions on Graphics (Proc. SIGGRAPH)*, 23(3), 294-302, 2004, (2004), 9 pages.

Barnes, Connelly et al., "PatchMatch: A Randomized Correspondence Algorithm for Structural Image Editing", *ACM SIGGRAPH 2009 Papers* (New Orleans, Louisiana, Aug. 3-7, 2009), 10 pages.

Jain, Vardhman et al., "Video Completion for Indoor Scenes", *Computer Vision, Graphics, and Image Processing: 5th Indian Conference, ICVGIP 2006*, Madurai, India, Dec. 13-16, 2006, (Dec. 13, 2006), 12 pages.

Jia, Yun-Tao et al., "Video Completion Using Tracking and Fragment Merging", *The Visual Computer* 21(8), (2005), 9 pages.

Ke, Qifa et al., "A Subspace Approach to Layer Extraction", *IEEE Computer Society Conference on Computer Vision and Pattern Recgonition*, (2001), 8 pages.

Kokaram, Anil et al., "A Bayesian Framework for Recursive Object Removal in Movie Post-Production", *IEEE International Conference on Image Processing (ICIP)*, Barcelona, Spain, (2003), 4 pages.

Lucas, Bruce D., "An Iterative Image Registration Technique with an Application to Stereo Vision", *Proceedings of 7th International Joint Conference on Artificial Intelligence (LICAI)*, Aug. 24-28, 1981, Vancouver, British Columbia, (Aug. 24, 1981), pp. 674-679.

Perez, et al., "Poisson Image Editing", *ACM Trans. Graph.*, vol. 22, (Jul. 2003), pp. 313-318.

Shih, Timothy K., et al., "Video Inpainting and Implant via Diversified Temporal Continuations", *Proceedings of the 14th Annual ACM International Conference on Multimedia*, Oct. 22-27, 2006, California, USA, (Oct. 22, 2006), 4 pages.

Shiratori, Takaaki et al., "Video Completion by Motion Field Transfer", *Computer Vision and Pattern Recognition, 2006 IEEE Computer Society Conference on 1* (Jun. 2006), 8 pages.

Wexler, Yonatan et al., "Space-Time Completion of Video", *IEEE Transactions of Pattern Analysis and Machine Intelligence*, vol. 29, No. 3 (Mar. 2007), 14 pages.

U.S. Appl. No. 12/954,445, filed Nov. 24, 2010.

Zhang, G., Hua, W., Qin, X., Shao, Y., and Bao, H. 2009. Video stabilization based on a 3d perspective camera model. The Visual Computer 25, 11, 997-1008.

Singular value decomposition, downloaded from http://en.wikipedia.org/wiki/Singualr_value_decomposition[Nov. 29, 2010 10:47:04 AM] on Nov. 29, 2010, 14 pages.

Bhat, P., Zitnick, C. L., Snavely, N., Agarwala, A., Agrawala, M., Cohen, M., Curless, B., and Kang, S. B. 2007. Using photographs to enhance videos of a static scene. In Rendering Techniques 2007: 18th Eurographics Workshop on Rendering, 327-338.

Brand, M. 2002. Incremental singular value decomposition of uncertain data with missing values. In 7th European Conference on Computer Vision (ECCV 2002), 707-720.

Buchanan, A. M., and Fitzgibbon, A. 2005. Damped Newton algorithms for matrix factorization with missing data. In IEEE Computer Society Conference on Computer Vision and Pattern Recognition, 316-322.

Buehler, C., Bosse, M., and McMillan, L. 2001. Non-metric image-based rendering for video stabilization. In 2001 Conference on Computer Vision and Pattern Recognition (CVPR 2001), 609-614.

Igarashi, et al. "As-Rigid-As-Possible Shape Manipulation" ACM Transactions on Graphics 2005.

Chen, B.-Y., Lee, K.-Y., Huang, W.-T., and Lin, J.-S. 2008. Capturing intention-based full-frame video stabilization. Computer Graphics Forum 27, 7, 1805-1814.

Chen, P. 2008. Optimization algorithms on subspaces: Revisiting missing data problem in low-rank matrix. Int. J. Comput. Vision 80, 1, 125-142.

Davison, A. J., Reid, I. D., Molton, N. D., and Stasse, O. 2007. MonoSLAM: Real-time single camera SLAM. IEEE Transactions on Pattern Analysis and Machine Intelligence 26, 6, 1052-1067.

Fitzgibbon, A., Wexler, Y., and Zisserman, A. 2005. Image-based rendering using image-based priors. International Journal of Computer Vision 63,2 (July), 141-151.

Avidan, et al. "Seam Carving for Content-Aware Image Resizing" ACM Transactions on Graphics 2007.

Goh, A., and Vidal, R. 2007. Segmenting motions of different types by unsupervised manifold clustering. In IEEE Computer Vision and Pattern Recognition (CVPR), 1-6.

Irani, M. 2002. Multi-frame correspondence estimation using subspace constraints. International Journal of Computer Vision 48, 1, 39-51.

Lee, J., and Shin, S. Y. 2002. General construction of time domain filters for orientation data. IEEE Transactions on Visualization and Computer Graphics 8,2 (April-June), 119-128.

Lee, K.-Y., Chuang, Y.-Y., Chen, B.-Y., and Ouhyoung, M. 2009. Video stabilization using robust feature trajectories. In IEEE ICCV.

Liu, F., Gleicher, M., Jin, H., and Agarwala, A. 2009. Content-preserving warps for 3d video stabilization. ACM Transactions on Graphics (Proceedings of SIGGRAPH 2009) 28,3 (Aug.), Article No. 44.

Matsushita, Y., Ofek, E., Ge, W., Tang, X., and Shum, H.-Y. 2006. Full-frame video stabilization with motion inpainting. IEEE Transactions on Pattern Analysis and Machine Intelligence 28,7,1150-1163.

Morimoto, C., and Chellappa, R. 1997. Evaluation of image stabilization algorithms. In DARPA Image Understanding Workshop DARPA97, 295-302.

Nister, D., Naroditsky, O., and Bergen, J. 2004. Visual odometry. In IEEE Computer Vision and Pattern Recognition (CVPR), 652-659.

Shi, J., and Tomasi, C. 1994. Good features to track. In IEEE Conference on Computer Vision and Pattern Recognition, 593-600.

Sinha, S., Frahm, J.-M., Pollefeys, M., and Genc, Y. 2006. Gpu-based video feature tracking and matching. In Workshop on Edge Computing Using New Commodity Architectures (EDGE 2006).

Tomasi, C., and Kanade, T. 1992. Shape and motion from image streams under orthography: a factorization method. Int. J. Comput. Vision 9, 2, 137-154.

Torr, P. H. S., Fitzgibbon, A. W., and Zisserman, A. 1999. The problem of degeneracy in structure and motion recovery from uncalibrated image sequences. International Journal of Computer Vision 32, 1, 27-44.

Vidal, R., Tron, R., and Hartley, R. 2008. Multiframe motion segmentation with missing data using power factorization and gpca. Int. J. Comput. Vision 79, 1, 85-105.

Gal, et al. "Feature-aware Texturing" School of Computer Science, Tel Aviv University, Israel; Draft version. The original paper appeared in EGSR '06 proceedings.

"Final Office Action", U.S. Appl. No. 12/954,445, (Jul. 10, 2013), 8 pages.

"Non-Final Office Action", U.S. Appl. No. 12/954,445, Jul. 16, 2014, 8 pages.

\* cited by examiner

METHODS AND APPARATUS FOR SUBSPACE VIDEO STABILIZATION

PRIORITY INFORMATION

This application claims benefit of priority of U.S. Provisional Application Ser. No. 61/382,822 entitled "Methods and Apparatus for Subspace Video Stabilization" filed Sep. 14, 2010, the content of which is incorporated by reference herein in its entirety.

BACKGROUND

Description of the Related Art

One of the most obvious differences between professional and amateur level video is the quality of camera motion; hand-held amateur video is typically shaky and undirected, while professionals use careful planning and equipment such as dollies or steadicams to achieve directed motion. Such hardware is impractical for many situations, so video stabilization software is a widely used and important tool for improving casual video.

Conventional techniques for software video stabilization follow two main approaches, and tend to provide either high quality or robustness and efficiency. These two approaches are two-dimensional (2D) video stabilization and three-dimensional (3D) video stabilization.

2D Video Stabilization

One conventional approach to software video stabilization is 2D stabilization, which is widely implemented in commercial software. This approach applies 2D motion models, such as affine or projective transforms, to each video frame. Though conventional 2D stabilization tends to be robust and fast, the amount of stabilization it can provide is very limited because the motion model is too weak; it cannot account for the parallax induced by 3D camera motion.

Conventional two-dimensional video stabilization techniques work by estimating a 2D motion model (such as an affine or projective transform) between consecutive frames, computing new motions that remove high-frequency jitter, and applying per-frame warps to achieve the new motion. Standard 2D stabilization is robust and efficient, but can only achieve limited smoothing, since 2D warps cannot account for the parallax induced by a moving camera. While some conventional 2D methods have attempted more aggressive smoothing, for example by carefully planned interpolation in a transform space or directly optimizing long trajectories, the inability to accommodate parallax fundamentally limits the amount of smoothing possible.

3D Video Stabilization

In contrast to conventional 2D video stabilization techniques, conventional 3D video stabilization techniques may perform much stronger stabilization, and may even simulate 3D motions such as linear camera paths. In this approach, a 3D model of the scene and camera motion are reconstructed using structure-from-motion (SFM) techniques, and then novel views are rendered from a new, smooth 3D camera path. However, a problem with 3D stabilization is the opposite of 2D: the motion model is too complex to compute quickly and robustly. SFM is a fundamentally difficult problem, and the generality of conventional solutions is limited when applied to the diverse camera motions of amateur-level video. In general, requiring 3D reconstruction hinders the practicality of the 3D stabilization pipeline.

Conventional three-dimensional video stabilization typically begins by computing a 3D model of the input camera motion and scene. Image-based rendering techniques can then be used to render novel views from new camera paths for videos of static scenes. Dynamic scenes are more challenging, however, since blending multiple frames may cause ghosting. In some conventional techniques, ghosting may be reduced or avoided by fitting a homography to each frame; however, this approach cannot handle parallax.

Content-Preserving Warps

Content-preserving warps, or content-aware warps, have been introduced as a non-physically-realistic approach to rendering the appearance of new camera paths for dynamic scenes. A content-preserving warp is content-aware in that it attempts to maintain as much as possible the original characteristics of the objects in the scene that are most likely to be noticeable to a viewer. In this method, the reconstructed 3D point cloud is projected to both the input and output cameras, producing a sparse set of displacements that guide a spatially-varying warping technique.

Structure from Motion (SFM)

While 3D stabilization techniques can achieve high quality camera motions through extremely stabilized 3D camera paths, their practicality is limited by the need to perform 3D reconstruction through structure-from-motion (SFM). There are fundamental issues that make a robust, efficient and general solution to the SFM problem challenging. The problem is inherently non-linear and often has ambiguities, so most conventional methods make restrictive assumptions about the input and/or resort to large-scale non-linear optimization.

SFM has issues with robustness and generality, as some videos simply do not contain sufficient motion information to allow for reconstruction. These issues are particularly common in amateur-level video:

Lack of parallax. SFM is under-determined if the camera motion does not provide sufficient parallax, for example if it pans rather than translates or contains large, flat regions such as a person in front of a wall. Some conventional techniques can discover degenerate motions and switch motion models in response, but this adds yet another moving part to the system that has the potential to fail.

Camera zooming. Differentiating between camera zoom and forward motion is a well-known problem in SFM, so many conventional techniques assume that the camera is calibrated or that its internal parameters are fixed.

In-camera stabilization. Many if not most modern video cameras damp camera shake either optically or digitally, effectively changing the internal parameters of the camera on a per-frame basis. Again, most SFM techniques assume the camera is calibrated or that its internal parameters are fixed.

Rolling shutter. Many consumer-level video cameras employ a CMOS sensor that does not expose a frame all at once, but instead exposes in a time-varying fashion from top-to-bottom, causing wobble and shear in the video. This time-variation causes severe problems for conventional SFM techniques.

Efficiency may also be a problem, since SFM typically requires global non-linear optimization. Most conventional SFM implementations are not streamable (i.e., they require random access to the entire video rather than just a window surrounding the current frame) since they need to perform multiple iterations of optimization. Some real-time SFM systems have been demonstrated; however, these all require a calibrated video camera. Also, these conventional systems focus on camera motion recovery rather than scene reconstruction, and thus yield very sparse 3D reconstruction, which might not yield enough information for 3D video stabilization.

SUMMARY

Various embodiments of methods, apparatus, and computer-readable storage media for subspace video stabilization are described. A technique for video stabilization is described that is robust and efficient, yet provides high quality results over a range of videos. When compared to conventional three-dimensional (3D) video stabilization techniques employing structure from motion (SFM) technology, the video stabilization techniques described herein are relatively simple and may require no special handling of the above-noted problems in techniques employing SFM, since none of the problems change the subspace properties of motion trajectories on which embodiments of the technique rely. Furthermore, embodiments of the technique may be performed in real-time or near real-time, may use linear approximations to bilinear optimizations for efficiency, and may be computed in a streaming fashion.

In at least some embodiments of a subspace video stabilization technique, an input video sequence may be obtained. A two-dimensional (2D) point tracking technique may be applied to the video sequence, and the 2D trajectories of sparse scene points may be assembled into an incomplete trajectory matrix. The trajectory matrix may then be factored into two low-rank matrices: a coefficient matrix representing the features, and an eigen-trajectory matrix representing camera motion over time. To perform factorization, in some embodiments, a moving factorization technique may be performed to efficiently find a time-varying subspace approximation to the input motion that locally represents the trajectories as the product of basis vectors, referred to as eigen-trajectories, and a coefficient matrix that describes each feature as a linear combination of these eigen-trajectories. The eigen-trajectories may then be smoothed. In some embodiments, a motion planning (or smoothing) technique may be applied to the eigen-trajectories, effectively smoothing the input motion while respecting the low rank relationship of the motion of points in the scene. The smoothed eigen-trajectories may be combined (e.g., re-multiplied) with the original coefficient matrix to yield a set of smoothed output trajectories. The smoothed output trajectories may be passed to a rendering technique, such as a content-preserving warp technique. The rendering technique may warp the input video sequence according to the smoothed output trajectories to produce an output, stabilized video sequence.

Embodiments of the subspace video stabilization methods as described herein may be implemented in software, hardware, or a combination thereof. For example, embodiments of the subspace video stabilization methods may be performed by a subspace video stabilization module implemented by program instructions stored in a computer-readable storage medium and executable by one or more processors (e.g., one or more CPUs or GPUs). Embodiments of a subspace video stabilization module may, for example, be implemented as a stand-alone application, as a module of an application, as a plug-in for applications including image or video processing applications, and/or as a library function or functions that may be called by other applications such as image processing or video processing applications.

In addition to computer system implementations, embodiments of the subspace video stabilization methods as described herein may be implemented in other devices, for example in digital video cameras.

While several techniques are described herein as being applied to video stabilization, one or more of the techniques described herein may also be applied to other video processing tasks.

Figure 1:
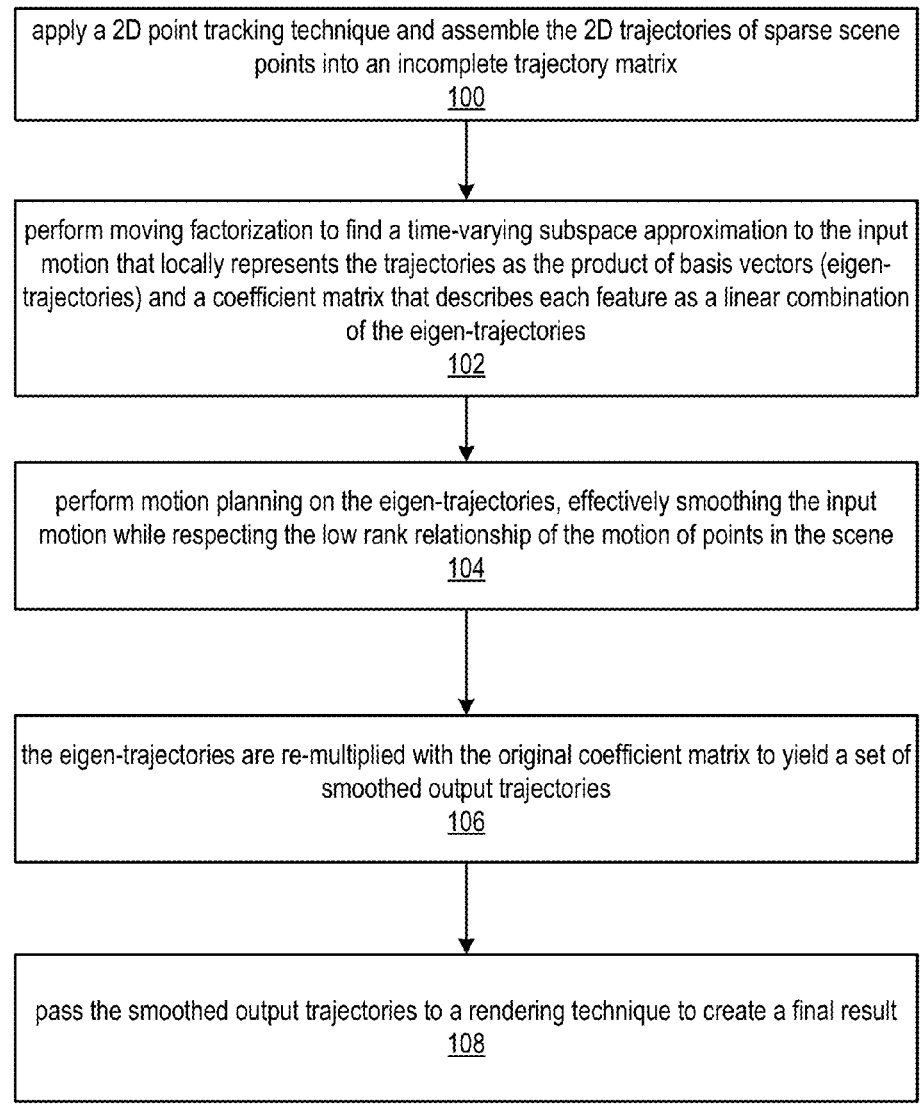
FIG. 1 is a flowchart of a subspace video stabilization technique, according to at least some embodiments.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Various embodiments of methods, apparatus, and computer-readable storage media for subspace video stabilization are described. A technique for video stabilization is described that is robust and efficient, yet provides high quality results over a range of videos. When compared to conventional 3D video stabilization techniques employing structure from motion (SFM) technology, the video stabilization techniques described herein are relatively simple and may require no special handling of the above-noted problems in techniques employing SFM, since none of the problems change the subspace properties of motion trajectories on which embodiments of the technique rely. Furthermore, embodiments of the technique may be performed in real-time or near real-time, may use linear approximations to bilinear optimizations for efficiency, and may be computed in a streaming fashion.

Embodiments of a subspace video stabilization technique are described that can achieve aggressive, high-quality stabilizations on a wide range of videos in a robust and efficient way. Embodiments of the subspace video stabilization technique may achieve the appearance of smooth camera motions without creating 3D reconstructions, allowing embodiments to operate efficiently and to work in situations where reconstruction is challenging. Therefore, embodiments of the subspace video stabilization technique are suitable for use in consumer-level video processing tools, as well as more advanced or professional video processing tools. Embodiments of the subspace video stabilization technique are based on the observation that accurate scene reconstruction is not necessary if the goal is merely to improve the quality of video. For video processing applications, visually plausible results are sufficient. By aiming for this simpler goal, embodiments may implement methods that avoid solving challenging computer vision problems when performing video stabilization.

While several techniques are described herein as being applied to video stabilization, one or more of the techniques described herein may also be applied to other video processing tasks.

Embodiments may provide a robust and efficient approach to video stabilization that achieves high-quality camera motion for a wide range of videos. Embodiments of the subspace video stabilization technique may focus on transforming a set of input 2D motion trajectories so that they are both smooth and resemble visually plausible views of the imaged scene; a key insight employed in embodiments is that this goal may be achieved by enforcing subspace constraints on feature trajectories while smoothing them. In at least some embodiments, the video stabilization technique involves generating, from two-dimensional (2D) point tracks (also referred to as feature trajectories) for a video sequence, a coefficient matrix representing features in the video sequence and basis vectors (also referred to as eigen-trajectories) representing camera motion over time in the video sequence. The basis vectors are smoothed in a manner that preserves their apparent relationships without making use of any three-dimensional (3D) information. Smoothed point tracks are generated by combining the smoothed basis vectors with the coefficient matrix, for example by multiplying the basis vectors by the coefficient matrix. The smoothed point tracks may then be used to warp the video sequence to generate a stabilized output sequence.

At least some embodiments may assemble tracked features in the video into a trajectory matrix, factor the trajectory matrix into two low-rank matrices, and perform filtering or curve fitting in a low-dimensional linear space. In order to more efficiently process long videos, embodiments of the video stabilization technique may employ a moving factorization technique that is both efficient and streamable. Experimental results are provided that confirm that this approach can efficiently provide stabilization results comparable with conventional 3D video stabilization methods in cases where those methods succeed, but also provides smooth camera motions in cases where such conventional approaches often fail, such as videos that lack parallax. Embodiments may thus provide a video stabilization technique that both achieves high-quality video stabilization and that is practical enough for consumer applications.

Embodiments may thus implement a subspace video stabilization technique that combines the advantages of 2D and 3D video stabilization. Embodiments of the subspace video stabilization technique may achieve the strongly stabilized, high-quality appearance of 3D stabilization and the efficiency and robustness of 2D methods. Both 2D and 3D stabilization methods may be summarized by three steps: (1) track scene points; (2) compute where the tracked points should be located in the output to stabilize the video content; and (3) render an output video which both follows those point locations and looks natural.

The second step is a key challenge of stabilization: new, smooth motion trajectories that respect geometric relationships between points are needed, so that the motion trajectories appear as the motion of a plausible, non-distorted view of the scene. 2D reconstruction approaches enforce plausibility by limiting changes to 2D transformations, which is simple but too limiting. 3D reconstruction approaches reconstruct a 3D model of the scene and use the 3D model to enforce the validity of synthesized views. However, performing 3D reconstruction is error-prone and may be overkill for the stabilization problem.

An ideal constraint should restrict the smoothed motion trajectories to visually plausible solutions without being too restrictive, and should be efficient and robust to compute. A key insight is that such a constraint may be achieved by leveraging the fact that a matrix of motion trajectories of a rigid scene imaged by a moving camera over a short period of time should approximately lie in a low-dimensional subspace. Embodiments of the subspace video stabilization technique may incorporate and extend this insight by applying the constraint to a moving window over the length of a potentially long video; that is, embodiments efficiently compute a time-varying subspace through moving factorization. Via this technique, embodiments of the subspace video stabilization technique may achieve visual plausibility by performing motion smoothing in this time-varying subspace rather than directly on the original 2D trajectories. The result is that embodiments implement an approach to video stabilization that achieves the strongly stabilized, high-quality appearance of 3D video stabilization methods, with the efficiency, robustness, and generality of 2D video stabilization methods.

FIG. 1 is a flowchart of a subspace video stabilization technique, according to at least some embodiments. As indicated at 100, a 2D point tracking technique is applied, and the 2D trajectories of sparse scene points are assembled into an incomplete trajectory matrix. As indicated at 102, a moving factorization technique is performed to efficiently find a time-varying subspace approximation to the input motion that locally represents the trajectories as the product of basis vectors, referred to as eigen-trajectories, and a coefficient matrix that describes each feature as a linear combination of these eigen-trajectories. As indicated at 104, a motion planning (or smoothing) technique is applied to the eigen-trajectories, effectively smoothing the input motion while respecting the low rank relationship of the motion of points in the scene. As indicated at 106, the smoothed eigen-trajectories are combined (e.g., re-multiplied) with the original coefficient matrix to yield a set of smoothed output trajectories. As indicated at 108, the smoothed output trajectories may be passed to a rendering technique, such as a content-preserving warping technique, also referred to as a content-aware warp technique, to create a final result. The rendering technique may warp the input video sequence according to the smoothed output trajectories to produce an output, stabilized video sequence.

Embodiments of the subspace video stabilization technique may achieve the high quality stabilization results seen in 3D stabilization, without computing a 3D reconstruction. On videos where SFM performs well, results of the subspace video stabilization technique may be comparable to results of conventional methods. However, the subspace video stabilization technique is more efficient than these conventional methods, and allows for a streaming implementation. Furthermore, embodiments of the subspace video stabilization technique may handle a wide range of inputs including inputs that are challenging for conventional SFM, such as videos that lack parallax, and videos that exhibit camera zoom, in-camera stabilization, or rolling shutter artifacts.

At least some embodiments may employ a content-aware warping technique and/or one or more other techniques as described in U.S. patent application Ser. No. 12/276,119, entitled "Content-Aware Video Stabilization," filed Nov. 21, 2008, the content of which is incorporated by reference herein in its entirety. The content-preserving warp technique applies a homography to get a rough approximation of the overall warp. The content-preserving warp technique then uses known trajectories to guide a deformation of a mesh. Even though the results of such a warp may not be physically accurate, the results are generally visually plausible.

The elements of the method illustrated in FIG. 1 will be further described below.

Subspace Video Stabilization

As illustrated at 100 of FIG. 1, embodiments of the subspace video stabilization technique may first compute a set of sparse 2D feature trajectories using a 2D point tracking technique, and assemble the 2D trajectories into an incomplete trajectory matrix. In at least some embodiments of the subspace video stabilization technique, Kanade-Lucas-Tomasi (KLT) feature tracker technology may be used as the 2D point tracking technique. In other embodiments, other feature tracking techniques may be used. Given a set of 2D point trajectories, video stabilization may be split in two problems: (1), where should those points be located in the output to stabilize the video content, and (2), how to render an output video which both follows those point locations and looks natural.

To more formally define the first problem, a set of N input feature trajectories is formed across F frames whose i-th trajectory is $\{(x_t^i, y_t^i)\}$, where $(x_t^i, y_t^i)$ are coordinates at frame t. These trajectories can be assembled into a trajectory matrix M:

$$M_{2N \times F} = \begin{bmatrix} x_1^1 & x_2^1 & \ldots & x_F^1 \\ y_1^1 & y_2^1 & \ldots & y_F^1 \\ & & \vdots & \\ x_1^N & x_2^N & \ldots & x_F^N \\ y_1^N & y_2^N & \ldots & y_F^N \end{bmatrix} \quad (1)$$

Figure 2:
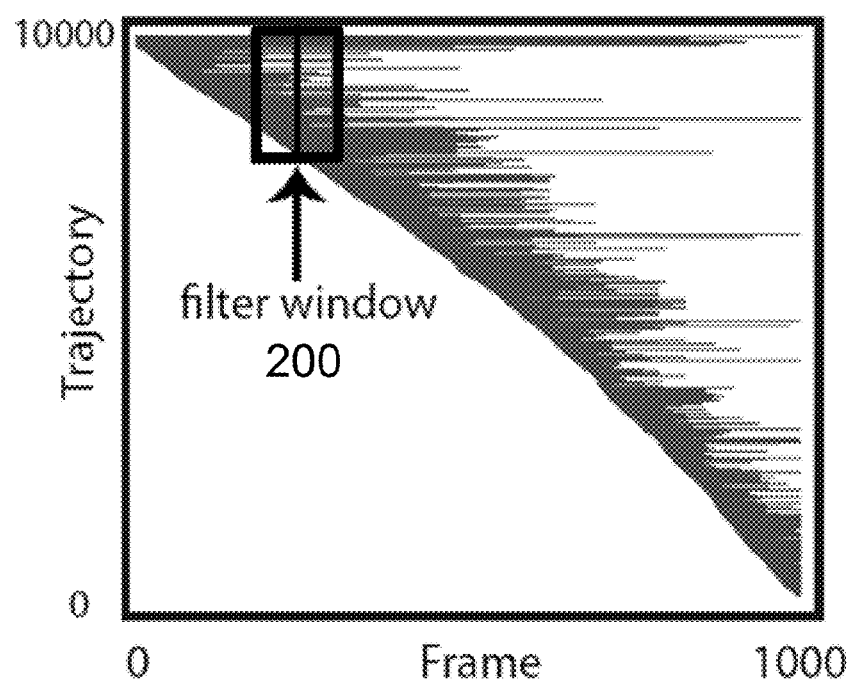
FIG. 2 illustrates a typical incomplete trajectory matrix, according to at least some embodiments.

Note that this matrix is highly incomplete, since trajectories will appear and disappear over the duration of the video. The occupancy of a typical trajectory matrix is illustrated in FIG. 2. FIG. 2 illustrates a typical incomplete trajectory matrix, with each tracked 2D point moving from left to right across the matrix. Note that there are many more trajectories than frames, and the y-axis is scaled to make the matrix appear roughly diagonal. Filter window 200 represents a typical low-pass filter kernel.

A task is to create a new matrix of trajectories $\hat{M}$ that guides the rendering of a new, stabilized video; this may be performed either by traditional full-frame warping or by content-preserving warps. This new matrix should both contain smooth trajectories and be consistent with the original 3D scene imaged by a moving camera. The latter property is hard to satisfy accurately without actually reconstructing the input geometry; however, visual plausibility may be achieved by preserving the low-rank property of apparent motion while the trajectories are smoothed. The following describes what happens if this property is not preserved, and then describes a technical approach using subspace constraints that may be used in at least some embodiments of the subspace video stabilization technique.

Simple Trajectory Filtering

An assumption is made that it is desired to create a new motion by low-pass filtering the original motion across time (canonical motion paths, such as lines or parabolas, are addressed later in this document). An assumption is also made that the scene is static. Non-static (moving) scene content is addressed later in this document. Large, strong smoothing kernels may be used to achieve the strongly stabilized look of 3D video stabilization. In at least some embodiments, a Gaussian low-pass filter may be used, with a standard deviation of $\sigma = w/\sqrt{2}$, where w is the radius (half the window size) of the filter in frames. Kernels with a radius of 20-200 frames for a 30 fps video may well describe a spectrum from spline-like motions (50) to almost linear motions (200), though the effect may depend on the smoothness of the input. A default filter radius that may be used is 50, which is much stronger than the filtering typically performed in conventional 2D stabilization. For example, a typical kernel radius that is used in conventional 2D stabilization is 6. Ideally, this smoothing would be performed on the recovered 3D camera motion, but since SFM is not being performed, this information is not available.

If the trajectory matrix is simply filtered directly, i.e., $\hat{M} = MK$ where K is a low-pass filter kernel, this would be the same as applying a low-pass filter to each trajectory individually via convolution. While such an approach does not explicitly constrain the relationships between points, the fact that the filter is linear and applied in the same way to all points implicitly preserves properties of the relationships between points. However, because the matrix M is not complete, the filtering operation is not linear—each point receives different treatment (based on its incompleteness), and therefore inter-point relationships are broken. The visual result of this naive approach is very poor; as shown in FIG. 3C, the geometry of the scene is clearly not respected.

Figure 3A:
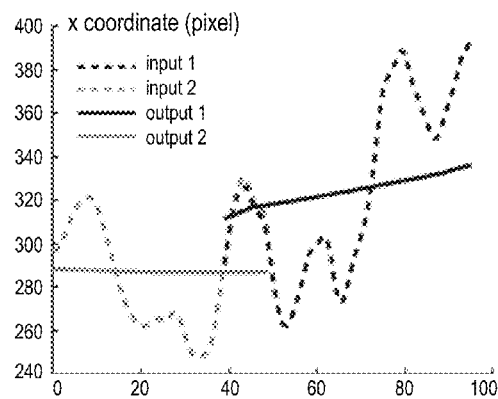
FIGS. 3A through 3D illustrate subspace low-pass filtering, according to at least some embodiments.
Figure 3B:
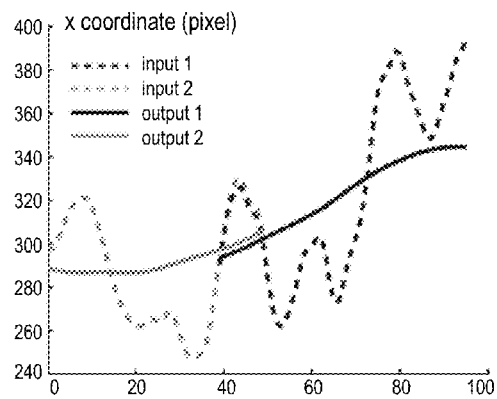
Figure 3C:
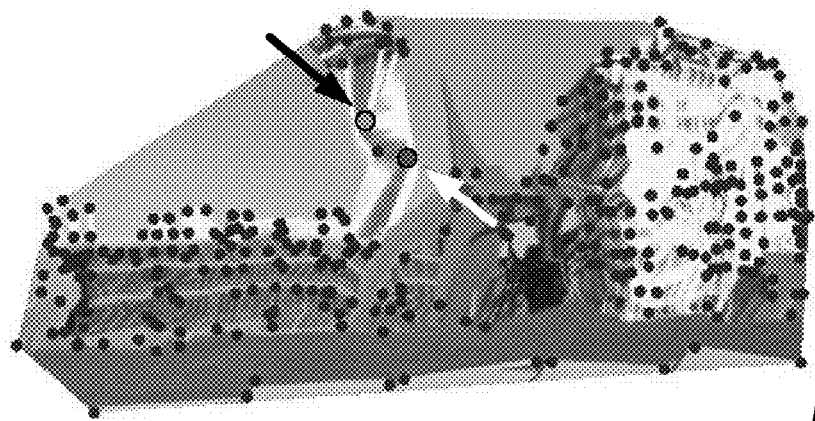
Figure 3D:
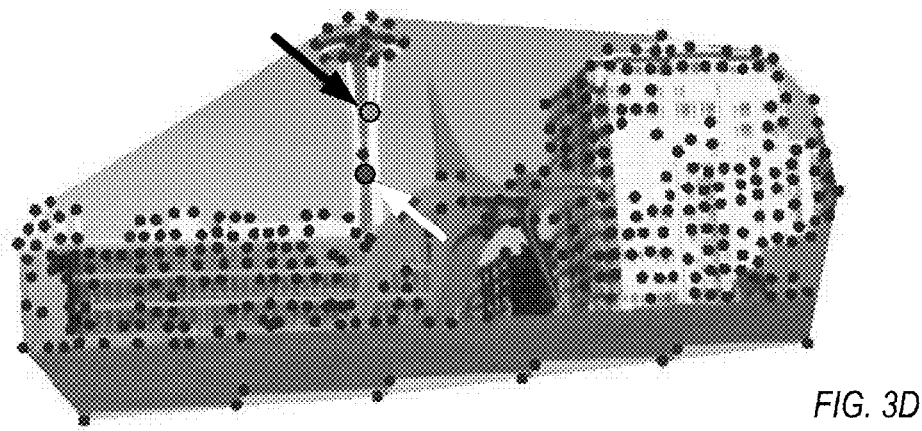

FIGS. 3A through 3D illustrate subspace low-pass filtering, according to at least some embodiments. FIG. 3A is a graph illustrating that a low-pass filter on two input trajectories (dashed lines) creates very different outputs (solid lines) for two similar trajectories, since their durations (and thus filter supports) are different, leading to broken geometric relationships in the rendered output as shown in FIG. 3C, which illustrates filtering each trajectory independently. FIG. 3B is a graph illustrating that, if the trajectory matrix is completed using matrix factorization (not shown), the filter outputs are more similar, leading to a better rendered result as shown in FIG. 3D, which illustrates filtering the eigen-trajectories. Note that these renderings (FIGS. 3C and 3D) are created using a 2D triangulation of the points to make the differences more clear.

An intuitive way to understand why this result is so poor is to examine what happens to nearby feature trajectories with different durations near their temporal boundaries, as shown in FIGS. 3A-3D. Because these trajectories have different temporal support regions for the smoothing kernel, the strength of the smoothing can differ significantly for nearby features, thus distorting local geometry.

There may be a number of simple solutions to this problem. One solution may be to simply discard the beginning and end of each feature trajectory, so that the kernel domain is always fully supported. However, since large smoothing kernels are used, this solution may not be practical, as there are often not enough trajectories that are long enough to support the warping stage (this problem most often occurs during camera panning, since features can enter and leave the field of view quickly). Another solution may be to extend each feature trajectory in duration using some sort of extrapolation or prediction. However, results of standard extrapolation using a polynomial model tend to be very poor; since each trajectory is extrapolated independently, geometric relationships with nearby features are again not preserved.

The following describes how subspace constraints may be used in embodiments of the subspace video stabilization technique to perform this extrapolation in a fashion that better preserves relationships between feature trajectories.

Subspace Constraints 3D reconstruction may allow the expression of geometric relationships between features. However, 3D reconstruction produces much more information than is necessary. Embodiments of the subspace video stabilization technique do not need to know the depths of points in the scene, and only need constraints that allow embodiments to preserve visual plausibility. Computer vision results suggest such a possible constraint that is weaker than a full reconstruction. When a rigid 3D scene is imaged by a moving affine camera, the observed motion trajectories should reside in a low-dimensional subspace. Under this subspace constraint, the trajectory matrix can be factored into a product of a camera matrix, representing each frame, and a scene matrix, representing each tracked point. If the trajectory matrix is complete, this factorization process is linear, fast, and robust. For an incomplete matrix, factorization is a non-linear problem.

Unfortunately, for the more common case of perspective cameras, the rank constraint becomes more complicated. In general, motion trajectories from a perspective camera will lie on a non-linear manifold instead of a linear subspace. However, it is possible to approximate the manifold locally (over a short period of time) with a linear subspace. In particular, for instantaneous motions a trajectory matrix should have at most rank 9. In this discussion, it may be assumed that this property holds over a short window of frames that is at least as large as the temporal smoothing kernel. The accuracy of this assumption is evaluated in more detail in the section titled Factorization accuracy, but the approximation may be sufficient for the purpose of insuring plausible views for video stabilization.

Filtering with Subspace Constraints

The following describes a method for filtering the trajectory matrix while maintaining this low-rank constraint that may be used in at least some embodiments. Consider a small window of the first k frames of an input sequence. Over this range of k frames, assume that the non-linear manifold on which the motion data lie can be locally modeled with a linear subspace of rank r. A rank value r=9 may be used in some embodiments; r=9 may model the data well without over-fitting or under-fitting. This low-rank constraint implies that the sub-matrix of the first k frames may be factored into the product of two low-rank matrices:

$$M_{2n \times k} \approx W \square (C_{2n \times r} E_{r \times k}) \quad (2)$$

where W is a binary mask matrix with 0 indicating missing data and 1 indicating existing data; the symbol $\square$ indicates component-wise multiplication (a method for performing this factorization is described later). The r row vectors of E may be referred to as eigen-trajectories, in that they represent the basis vectors that can be linearly combined to form a 2D motion trajectory over this window of k frames. The coefficient matrix C represents each observed feature as such a linear combination.

This factorization provides a straightforward way to smooth the trajectory matrix while preserving its rank. Embodiments may first fill in the missing data, and then low-pass filter the complete matrix and drop the elements corresponding to the missing data. However, it is not necessary to first complete the missing data, as smoothing is a linear operation which can be represented as a matrix multiplication, and matrix multiplication is associative:

$$\hat{M} = W \square (CE)K = W \square C(EK) = W \square C\hat{E}, \quad (3)$$

where $\hat{E}=EK$. In other words, this is equivalent to first low-pass filtering the eigen-trajectories E to obtain $\hat{E}$, and then obtaining a new sub-matrix $\hat{M}_{2n \times k}$ by multiplying $\hat{E}$ with the original coefficient matrix C and dropping the elements corresponding to the missing data. The latter strategy may be used in at least some embodiments, as it is more efficient to low-pass filter the eigen-trajectories. Also, for non-linear smoothing operations such as canonical path fitting, operating directly on the eigen-trajectories allows embodiments to preserve the low-rank property whether or not the smoothing operation would do so if applied directly to the trajectories themselves.

The result of the above factorization is a set of eigen-trajectories that can take any partial trajectory through the first k frames and complete it to a full trajectory. A final step before smoothing is to extend this approach across the duration of the entire video. While the entire matrix M may not be well modeled with a low-rank subspace because the data lie on a non-linear manifold, it may be assumed that it is over a range of k frames. This property implies that for any range of k frames in the matrix in FIG. 2, a local factorization can be computed that well models the portion of the matrix over the k frames that has existing values. To support the low-pass filter, the factorization only needs to be able to extend each trajectory forwards and backwards in time by the radius of the smoothing kernel; thus, the factorization does not need to be accurate everywhere, but only locally near the original trajectory values (e.g., near the diagonal of FIG. 2). Given a factorization of the first k frames, embodiments may propagate it forwards in a fashion that is consistent with the existing factorization, and that explains the new data as well. In essence, embodiments of the subspace video stabilization technique may track a time-varying subspace. In at least some embodiments of the subspace video stabilization technique, this may be accomplished in a greedy, moving fashion using a moving factorization technique as described below.

Moving Factorization

As indicated at 102 of FIG. 1, embodiments of the subspace video stabilization technique may perform moving factorization to find a time-varying subspace approximation to the input motion that locally represents the trajectories as the product of basis vectors (eigen-trajectories) and a coefficient matrix that describes each feature as a linear combination of the eigen-trajectories. At least some embodiments may employ a moving factorization technique that may be customized to the video stabilization application and that is efficient, scalable, and streamable. In short, embodiments may perform factorization in a fixed window of k frames, and move that window forward δ frames at each step. In some embodiments, values k=50 and δ=5 may be used. However, other values for k and δ may be used in other embodiments.

Embodiments of the moving factorization technique may begin by factoring the first k frames. Fortunately, for this application there should be a reasonable number of complete trajectories that already span all k frames and that describe the subspace. Embodiments may therefore take these n complete feature trajectories and use them to assemble a sub-trajectory matrix $M^0_{2n \times k}$. $M^0$ is a complete matrix, and is a sub-matrix of M. Generally, n must be at least as large as r/2 to make the subspace constraint meaningful, and in practice n may be significantly larger than r/2. In the rare cases where n<2r, k may be reduced until there are a sufficient number of trajectories. Embodiments may then factor $M^0$ as follows:

$$M^0_{2n \times k} = C_{2n \times r} E_{r \times k} \quad (4)$$

In some embodiments, the factorization may be calculated by truncating the output of a singular value decomposition (SVD) technique to the rows, columns, and values corresponding to the largest r singular values, and then distributing the square root of each singular value to the left and right matrices.

Figure 4:
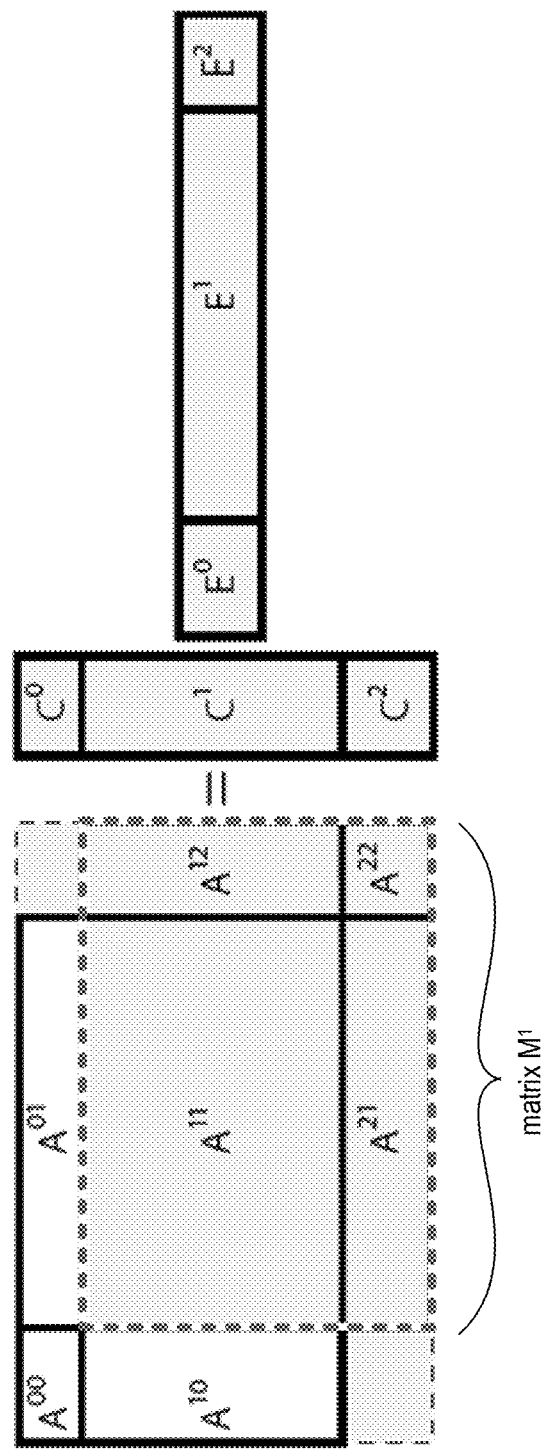
FIG. 4 illustrates moving matrix factorization, according to at least some embodiments.

Given a factorization of a window $M^0$, embodiments of the subspace video stabilization technique may compute the factorization $M^1$ of the next window (moved forward 5 frames) in the same fashion. Since the factorization windows are highly overlapped, the corresponding trajectory matrices $M^0$ and $M^1$ are also highly overlapped. FIG. 4 illustrates moving matrix factorization, according to at least some embodiments. The factorization for an additional δ frames may be computed by keeping $C^0$, $C^1$, $E^0$, and $E^1$ fixed, and computing $C^2$ and $E^2$. The gray dashed rectangle indicates matrix $M^1$. As shown in FIG. 4, by matrix permutation, $M^0$ and $M^1$ can be re-organized as:

$$M^0 = \begin{bmatrix} A^{00} & A^{01} \\ A^{10} & A^{11} \end{bmatrix} \text{ and } M^1 = \begin{bmatrix} A^{11} & A^{12} \\ A^{21} & A^{22} \end{bmatrix}$$

respectively, where $A^{11}$ is shared between $M^0$ and $M^1$. Note that the factorization of $A^{11} = C^1 E^1$ was already computed when $M^0$ was factored, so, in at least some embodiments, these values may be kept fixed, and $M^1$ may be processed as follows:

$$M^1 = \begin{bmatrix} A^{11} & A^{12} \\ A^{21} & A^{22} \end{bmatrix} = \begin{bmatrix} C^1 \\ C^2 \end{bmatrix} [E^1 \ E^2]. \quad (5)$$

To estimate $C^2$ and $E^2$ in a fashion that is both consistent with the already computed factorization (i.e., $C^1$ and $E^1$) and the new data (i.e., $A^{12}$, $A^{21}$, and $A^{22}$), in at least some embodiments, a least-squares technique may be applied by minimizing.

$$\min_{C^2, E^2} \|C^2 E^1 - A^{21}\|_F^2 + \|C^2 E^2 - A^{22}\|_F^2 + \|C^1 E^2 - A^{12}\|_F^2, \quad (6)$$

where $\|\cdot\|_F$ stands for the matrix Frobenius norm. Note that this is a bilinear optimization problem. However, to achieve an efficient solution, this may be solved approximately in a linear fashion, for example using a linear approximation technique. Since the factorization window moves forward a small number of frames per iteration, the size of $A^{22}$ may be significantly smaller than the size of $A^{21}$ and $A^{12}$. Therefore, in at least some embodiments, this problem may be solved by first estimating $C^2$ as the projection of $A^{21}$ onto $E^1$, $$C^2 = A^{21} E^{1T} (E^1 E^{1T})^{-1}, \quad (7)$$

and then solving for $E^2$ as follows:

$$E^2 = \left( \begin{bmatrix} C^1 \\ C^2 \end{bmatrix}^T \begin{bmatrix} C^1 \\ C^2 \end{bmatrix} \right)^{-1} \begin{bmatrix} C^1 \\ C^2 \end{bmatrix}^T \begin{bmatrix} A^{12} \\ A^{22} \end{bmatrix}. \quad (8)$$

This linear solution to the bilinear problem (equation 6) may be as or nearly as accurate as those obtained through conventional non-linear optimization techniques.

A final step in performing the moving factorization is to compute the coefficients for those trajectories that were too short to be included in matrix $M^1$. In at least some embodiments, the coefficients may be computed for any trajectory whose duration ends in the current factorization window and whose coefficients are not already computed by projecting it onto the eigen-trajectories, as in Equation 7.

Smooth Motion Planning

As indicated at 104 of FIG. 1, embodiments may perform motion planning on the eigen-trajectories, effectively smoothing the input motion while respecting the low rank relationship of the motion of points in the scene. Once the eigen-trajectories are computed using moving factorization, a final task before rendering is to smooth the eigen-trajectories to simulate smooth camera motion. Note that, unlike 3D video stabilization, there is no need to linearize the non-Euclidean space of camera orientations, since apparent motion is already represented with a linear approximation. This fact simplifies the motion planning compared to conventional techniques. Various embodiments may implement one or more of several techniques for motion planning, including but not limited simple low-pass filtering, automatic polynomial path fitting, and interactive spline fitting techniques, which are described below.

Low-Pass Filtering

A relatively simple approach to smooth camera motion that may be used in some embodiments is to run a low-pass filter over the eigen-trajectories. An advantage of this method is that it works for any length of video, and fits within a streaming framework where only a window of frames around the current frame need be accessible. Specifically, embodiments may only require access to a window of max(k, 2w) frames centered at the current frame, where k is the factorization window size and w is the radius of the smoothing kernel. A range of kernel sizes may be provided; however, in some embodiments, a default of w=50 may be provided. Embodiments may support much larger kernels than conventional 2D video stabilization techniques since the technique used in embodiments is not based on a 2D motion model, and can therefore account for parallax in the input.

Polynomial Path Fitting

Dramatic cinematographic effects may be created by moving a camera along a very simple path, such as a line or parabola. However, embodiments of the subspace video stabilization techniques may not achieve such motions exactly since embodiments do not know the 3D camera projection matrices. However, embodiments may achieve qualitatively similar results by fitting polynomial models to the eigen-trajectories. In at least some embodiments, three polynomial motion models may be supported: constant, linear, and quadratic. Other polynomial models may be supported in some embodiments. A polynomial motion model for the eigen-trajectories that may be used in some embodiments may be represented as:

$$\hat{E}_t = \Sigma_{j=0}^d K_j t^j,$$

where $\hat{E}_t$ is a vector containing the values of the new eigen-trajectories at frame t, d is the degree of the polynomial, and each $K_j$ is an unknown r-element vector that is the coefficient for the polynomial term. Degree-d polynomial eigen-trajectories lead to degree-d polynomial feature trajectories:

$$(x_t^i, y_t^i) = (C_{2i} \Sigma_{j=0}^d K_j t^j, C_{2i+1} \Sigma_{j=0}^d K_j t^j).$$

Embodiments may compute the $K_j$ coefficients of this polynomial model for the output eigen-trajectories as the best polynomial approximation of the input eigen-trajectories. Specifically, the displacement between the new position and the original position of every feature point may be minimized:

$$\min_{\hat{E}} \| W \Box (C \hat{E} - CE) \|_F^2 \quad (9)$$

The optimal polynomial eigen-trajectories may be computed by solving the above linear system. Note that the result of this process creates a 2D polynomial path for each output trajectory, which is different than fitting a 3D polynomial to the camera's motion; however, the visual result tends to be similar. Also note that this approach to planning camera motion may require access to the whole video, and may not be computable in a streaming fashion.

Interactive Spline Fitting

Polynomial path fitting may not be appropriate for long videos, since their motion cannot be well modeled with a single polynomial. In these cases, at least some embodiments may provide an interface that allows the user to select several keyframes. A standard spline may then be fit to the eigen-trajectories with knots at the keyframes. In some embodiments, the user can choose between quadratic and cubic splines. Since the feature trajectories are linear combinations of the eigen-trajectories, a quadratic (or cubic) spline for the eigen-trajectories leads to a quadratic (or cubic) spline for each output feature trajectory. However, this motion planning approach may not be computable in a streaming fashion.

Dynamic Scene Content

The low-rank constraints of which embodiments may take advantage may not hold for moving objects in the scene, that is to objects that are moving relative to the background of the scene. Therefore, in at least some embodiments, as many of these outlier trajectories as possible may be removed before performing factorization and content-preserving warps (a small number of remaining outliers can be treated by the factorization algorithm as noise). Various embodiments may remove such outlier trajectories using one or more strategies. Three example strategies that may be used are described below.

A first example strategy that may be used to remove outlier trajectories is based on the observation that trajectories on moving objects are typically much shorter than those on rigid objects. Therefore, in some embodiments, trajectories shorter than a threshold (e.g., 20 frames) may be removed entirely. In addition, trajectories shorter than k frames do not influence the eigen-trajectories, since factorization is only computed on trajectories that are complete over the window.

A second example strategy that may be used to remove outlier trajectories in some embodiments is to rule out motion outliers using a fundamental matrix constraint. Some embodiments may, for example, estimate a fundamental matrix between every five frames within a RANSAC loop, and remove a trajectory when it deviates from the epipolar constraint by more than one pixel for more than ⅓ of the duration that the algorithm has processed.

A third example strategy that may be used to remove outlier trajectories in some embodiments is to remove trajectories with a large factorization error after factorization is computed. A large factorization error may, for example, be classified as any trajectory whose per-frame error ever exceeds three pixels. Some embodiments may re-compute factorization after removing these outlier trajectories; however, the improvement in results may not be worth the computational expense, and therefore this re-computation may not be performed in other embodiments.

Experimental Validations of the Subspace Video Stabilization Methods

Two numerical experiments are described that experimentally validate two properties of the subspace video stabilization technique described above: the accuracy of the factorization scheme, and robustness to rolling shutter artifacts.

Factorization Accuracy

The incremental factorization approach that may be used in embodiments is an approximation in several ways. First, an assumption is made that motion trajectories over k frames can be described with a low-rank subspace; however, this is only approximately true. Second, the factorization approach is greedy, starting from the first k frames and moving forward using a linear approximation to the bilinear fitting; some sort of non-linear optimization may yield more accurate results.

The error of this factorization approach has been evaluated by computing the mean factorization error, i.e., the difference between the original trajectory and the same trajectory reconstructed from the subspace. Note that this error is computed before removing any large error outlier trajectories, as described in the section titled Dynamic scene content. For a diverse sample set of 70 videos resized to a resolution of 640×360, the mean error per video ranged from 0.08 to 0.26 pixels. Next, experiments were performed with several iterative global optimization techniques such as the damped Newton technique and Levenberg-Marquardt technique. It was found that these methods significantly reduced the factorization error (by a factor of 4, on average), at the expense of much longer computation times. However, this reduction in error did not significantly improve the visual quality of the results, perhaps because the error is already sub-pixel. It is also worth noting that embodiments of the subspace video stabilization technique may not need as precise a factorization as some other conventional applications, just one that leads to visual plausibility. Therefore, embodiments may use the efficient, streamable approach as described herein to obtain satisfactory results with less computation time than would be required by non-linear techniques.

Rolling Shutter Video

Many if not most consumer-level video cameras have CMOS sensors that can only be read-out in a sequential fashion from top to bottom. The result is that a video frame does not record a snapshot of time; instead, time varies across the frame, resulting in aliasing that can be seen as skewing or wobbling of objects in the video. This property of video poses serious challenges for both SFM and conventional 2D video stabilization.

In practice, it is found that embodiments of the subspace video stabilization technique as described herein works well on rolling shutter videos. While strong theoretical arguments are not provided as to why rolling shutter videos preserve the subspace constraint, it is possible that the artifacts appear as structured noise to the subspace video stabilization technique, which tends to be robust to noise. However, to confirm the performance of the subspace video stabilization technique on rolling shutter videos, an experiment was constructed and performed. In the experiment, a rolling shutter effect was approximately simulated for 30 videos shot with a 3-CCD camera (and thus free of rolling shutter). Then, factorization error was compared before and after the rolling shutter effect was added.

For the, experiments, rolling shutter was modeled by shifting each track according to its scanline. That is, for each feature trajectory at frame t its new position, $\tilde{p}_t = (x_t, y_t)$, was calculated by shifting the feature trajectory in time by $\lambda$ and interpolating its position at consecutive frames:

$$\tilde{p}_t = (1-\lambda)p_t + \lambda p_{t+1}, \qquad (10)$$

where $p_t$ and $p_{t+1}$ are its position at time t and t+1, respectively. These two coordinates are obtained from the tracking results of the non-rolling shutter video, and $\lambda$ is the shift in time. The value of $\lambda$ depends on the camera and vertical coordinate, i.e., $\lambda = \kappa(y_t/H)$, where H is the height of the video frame. The parameter $\kappa$ depends on the amount of rolling shutter introduced by the camera, and is typically less than 1. In the experiments, $\kappa$ is set at 1, which might exaggerate the rolling shutter effect.

Factorization was then performed on the original trajectory matrix and the simulated rolling shutter matrix. Only the first 100 frames of each sequence were considered, and only trajectories that spanned that entire duration were used, thus yielding a complete matrix that can be factorized using a singular value decomposition (SVD) technique. It was found that the mean factorization errors for these rolling shutter matrices are reasonably close to the original matrices: on average, the rolling shutter effect increases the factorization error by 13.5%. Note that rolling shutter may also negatively impact 2D tracking, since it introduces local distortion, and the experiments do not measure this impact.

These empirical experiments show that the effect of rolling shutter on the subspace constraint is relatively minor and can be treated as structured noise. Another 40 videos were taken using a rolling shutter camera, and the incremental factorization approach was performed on these videos. The mean reconstruction error for these rolling shutter videos was 0.165 pixels, compared to the 0.135 error of non-rolling shutter videos. Thus, in general, the subspace video stabilization technique produces visually good results for rolling shutter sequences.

Experimental Results of the Subspace Video Stabilization Methods

An embodiment of the subspace video stabilization technique as described herein has been tested on 109 video sequences, ranging from 5 to 180 seconds in length, captured by a variety of people and cameras in many different scenes. Of these videos, 48 were captured with a 3-CCD camera without a rolling shutter, and 61 were captured with a CMOS HD camera with a rolling shutter. The results of the subspace video stabilization technique were also compared to a conventional 3D stabilization technique and to conventional 2D stabilization features available in commercial technologies.

A first set of experiments evaluates the subspace video stabilization technique on a test set of 32 videos to demonstrate 3D video stabilization. Note that these sequences were specifically chosen to be friendly to structure-from-motion (SFM) techniques: they were shot by a constantly walking person to provide sufficient parallax, and exhibit no zooming or in-camera stabilization in order to keep the internal parameters of the camera fixed. It was found that the subspace video stabilization technique produced qualitatively similar results to those of conventional techniques for 25 of these videos, and better results for 7 of these videos. Two results are considered as similar if the camera stability and the degree of artifacts are similar, even if the exact motions and field of view of the results are slightly different.

Next, the subspace video stabilization technique was applied to 15 new videos captured with camera motions known to challenge SFM. A camera tracker was used that implements SFM, and the output of the SFM tracker failed since it produced a clearly incorrect reconstruction. The types of camera motions that are found to be challenging for SFM may include, but are not limited to: sequences that include periods of both walking, and panning while standing still; sequences with significant rolling shutter; sequences with in-camera stabilization left on; and sequences with changing focal length.

Note that other SFM implementations may perform better or worse than the one tested, but all of the above are well-known problems for SFM.

Of particular interest is how the subspace video stabilization technique as described herein works on rolling shutter videos since more and more new video cameras exhibit this artifact. Out of 61 example rolling shutter videos, it was found that 46 results of the subspace video stabilization technique were completely successful, 12 were moderately successful, and 3 were not successful. A result is considered moderately successful if it suffers from slight artifacts, like bouncing or wobbling locally, but is clearly preferable to the input. Rolling shutter is particularly challenging for 2D stabilization, since full-frame warps cannot remove the local wobbling it introduces. Two conventional 2D stabilization features available in commercial technologies (the second of which has a special feature designed for handling rolling shutter) were also applied to the example videos. It was found that the subspace video stabilization technique performs significantly better than the first conventional 2D stabilization technique for 47 out of 61 videos, and moderately better than the first technique for 11 out of 61 videos. The subspace video stabilization technique performs significantly better than the second conventional 2D stabilization technique for 42 out of 61 videos, and moderately better than the second technique for 16 out of 61 videos. The results are considered significantly better than those produced by the conventional 2D stabilization techniques when the results of the conventional techniques suffer from obvious high-frequency vibration, while results of the subspace video stabilization technique do not. For the remaining 3 out of the 61 videos, the subspace video stabilization technique fails entirely since the videos are heavily dominated by scene motion. However, for these 3 videos, both conventional 2D stabilization techniques produce results that are visually worse than the input.

Finally, several additional challenging scenes were tested. These include a very long video, and a video with large amounts of scene motion. Overall, of the 109 videos that were used to test the subspace video stabilization technique, 86 are considered as completely successful, 20 as moderately successful because they exhibit moderate bouncing or other small artifacts, and 3 as failures.

Example Implementations

Figure 5:
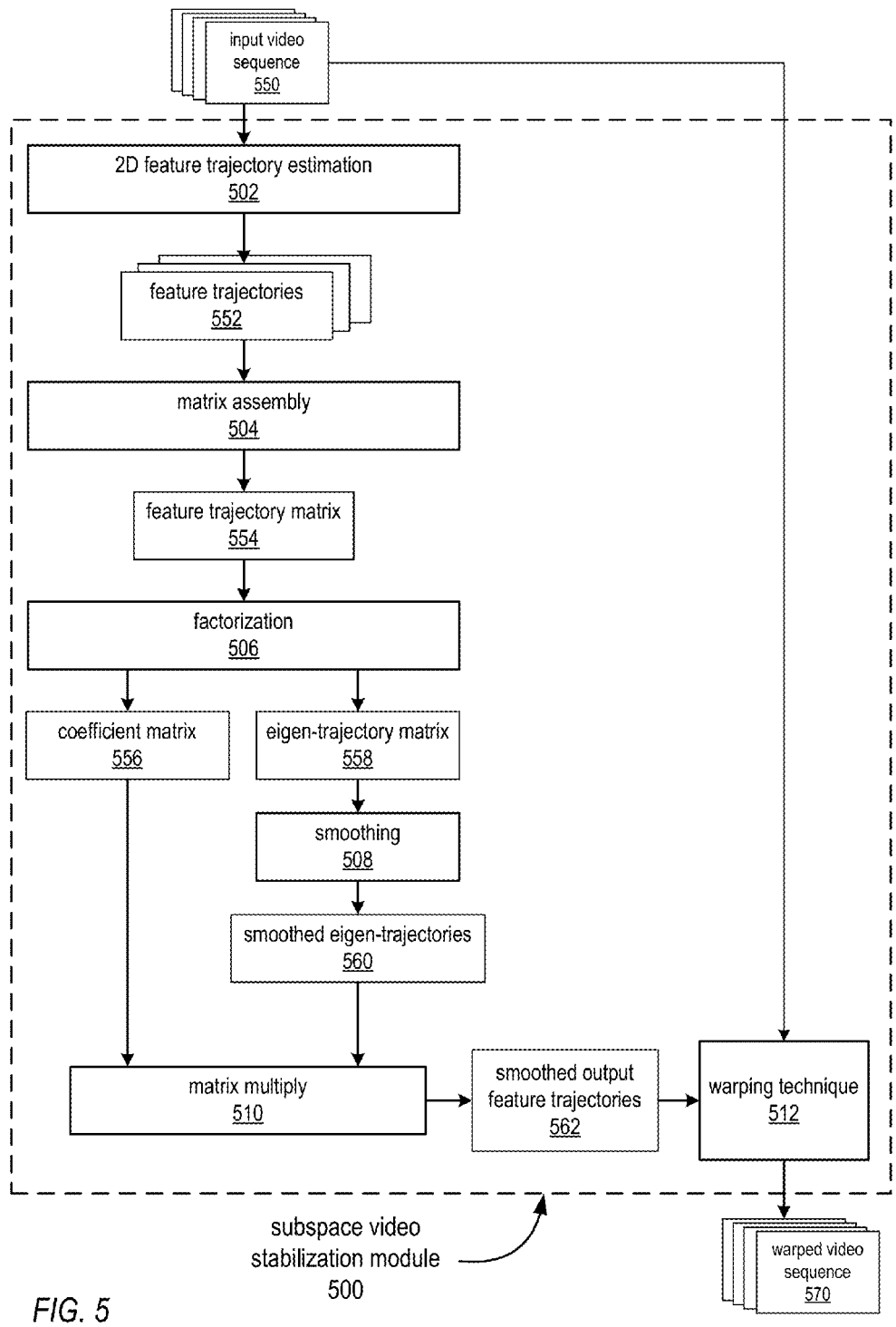
FIG. 5 illustrates an example subspace video stabilization module, and data flow and processing within the module, according to at least some embodiments.
Figure 6:
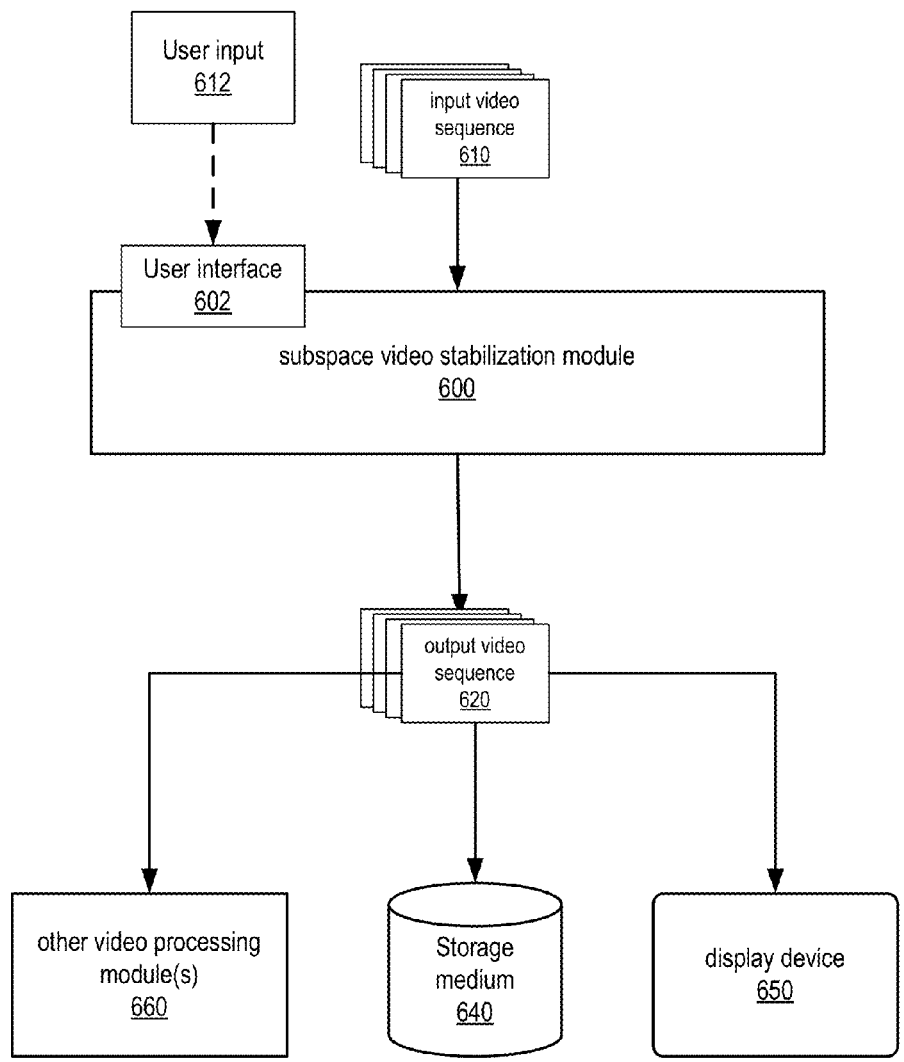
FIG. 6 illustrates a module that may implement subspace video stabilization methods as illustrated in FIGS. 1 through 5, according to at least some embodiments.
Figure 7:
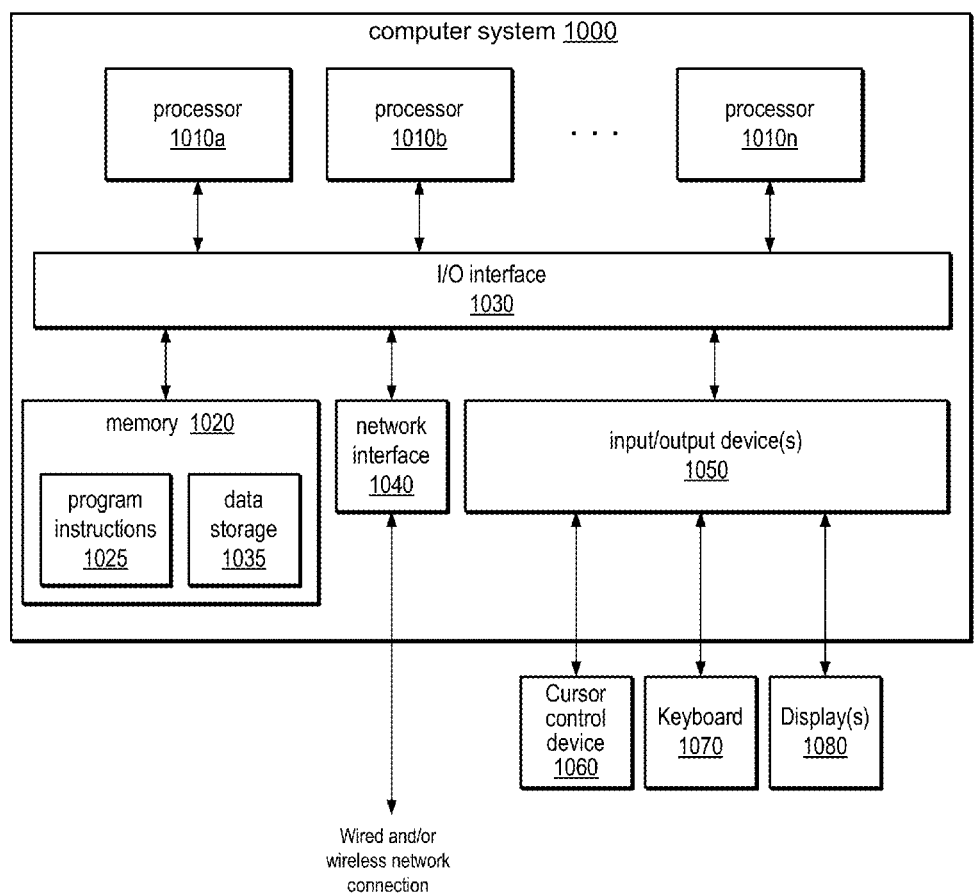
FIG. 7 illustrates an example computer system that may be used in embodiments.

Embodiments of the subspace video stabilization methods as described herein may be implemented in software, hardware, or a combination thereof. For example, embodiments of the subspace video stabilization methods may be performed by a subspace video stabilization module implemented by program instructions stored in a computer-readable storage medium and executable by one or more processors (e.g., one or more CPUs or GPUs). Embodiments of a subspace video stabilization module may, for example, be implemented as a stand-alone application, as a module of an application, as a plug-in for applications including image or video processing applications, and/or as a library function or functions that may be called by other applications such as image processing or video processing applications. Embodiments of the subspace video stabilization module may be implemented in any image or video processing application, or more generally in any application in which video sequences may be processed. Example applications in which embodiments may be implemented may include, but are not limited to, Adobe® Premiere® and Adobe® After Effects®. "Adobe," "Adobe Premiere," and "Adobe After Effects" are either registered trademarks or trademarks of Adobe Systems Incorporated in the United States and/or other countries. An example subspace video stabilization module that may implement the subspace video stabilization methods as described herein is illustrated in FIGS. 5 and 6. An example computer system on which a subspace video stabilization module may be implemented is illustrated in FIG. 7.

In addition to computer system implementations, embodiments of the subspace video stabilization methods as described herein may be implemented in other devices, for example in digital video cameras for video stabilization in captured video sequences, as a software module, hardware module, or a combination thereof.

FIG. 5 illustrates an example subspace video stabilization module 500, and data flow and processing within the module 500, according to at least some embodiments. FIG. 7 illustrates an example computer system on which embodiments of module 500 may be implemented. An input vide sequence 550 may be obtained. At 502, 2D feature trajectories 552 may be estimated from the input video 550. At 504, a feature trajectory matrix 554 may be assembled from feature trajectories 552. At 506, the feature trajectory matrix 554 may be factored, for example using a moving factorization technique as described herein, into two low-rank matrices: a coefficient matrix 556 representing the features, and an eigen-trajectory matrix 558 representing camera motion over time. The coefficient matrix 556 describes each feature as a linear combination of the eigen-trajectories 558. At 508, the eigen-trajectories 558 may be smoothed to generate smoothed eigen-trajectories 560. In at least some embodiments, a motion planning technique as described herein may be used in smoothing 508. At 510, smooth output feature trajectories 562 may be obtained by combining smoothed eigen-trajectories 560 with the original coefficient matrix 556. For example, smoothed eigen-trajectories 560 may be multiplied with the original coefficient matrix 556. At 512, the input video sequence 550 may be warped with the guidance of the new feature trajectories 562 to generate as output a warped, stabilized video sequence 570. In at least some embodiments, a content-preserving warp technique may be used as the warping technique 512.

While FIG. 5 shows the warping technique 512 as part of subspace video stabilization module 500, in some embodiments the warping technique 512 may be implemented external to module 500, for example as a separate video image frame warping module that accepts feature trajectories 564 and input video sequence 550 as input.

FIG. 6 illustrates an example subspace video stabilization module that may implement the subspace video stabilization methods as illustrated in FIGS. 1 through 5. FIG. 7 illustrates an example computer system on which embodiments of module 600 may be implemented. Module 600 receives as input a video sequence 610. In some embodiments, module 600 may receive user input 612 via user interface 602 specifying one or more video stabilization parameters as previously described, for example to select one or more keyframes to be used in the video stabilization technique. Module 600 then applies a subspace video stabilization technique as described herein, according to user input 612 received via user interface 602, if any. Module 600 generates as output a stabilized output video sequence 620. Output video sequence 620 may, for example, be stored to a storage medium 640, such as system memory, a disk drive, DVD, CD, etc. Output video sequence 620 may, in addition or instead, be displayed to a display device 650. Output video sequence 620 may, in addition or instead, be provided to one or more other video processing modules 660 for further processing.

Example System

Embodiments of a subspace video stabilization module and/or of the subspace video stabilization methods as described herein may be executed on one or more computer systems, which may interact with various other devices. One such computer system is illustrated by FIG. 7. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the subspace video stabilization methods disclosed herein may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for embodiments of a subspace video stabilization module are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a computer-accessible medium may include storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 7, memory 1020 may include program instructions 1025, configured to implement embodiments of a subspace video stabilization module as described herein, and data storage 1035, comprising various data accessible by program instructions 1025. In one embodiment, program instructions 1025 may include software elements of embodiments of a subspace video stabilization module as illustrated in the above Figures. Data storage 1035 may include data that may be used in embodiments. In other embodiments, other or different software elements and data may be included.

Those skilled in the art will appreciate that computer system 1000 is merely illustrative and is not intended to limit the scope of a subspace video stabilization module as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a digital video camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A non-transitory computer-readable storage medium comprising program instructions that, responsive to execution by one or more processors, implement:
    factoring two-dimensional (2D) feature trajectories from an input video sequence into a coefficient matrix representing features in the input video sequence and eigen-trajectories representing camera motion over time in the input video sequence;
    applying an interactive spline fitting technique to the eigen-trajectories effective to generate smoothed eigen-trajectories that simulate smooth camera motion;
    multiplying the smoothed eigen-trajectories that simulate smooth camera motion with the coefficient matrix representing features in the input video sequence effective to generate smoothed 2D feature trajectories; and
    warping the input video sequence according to the smoothed 2D feature trajectories to generate a stabilized output video sequence.

2. The non-transitory computer-readable storage medium as recited in claim 1, wherein the coefficient matrix describes each feature as a linear combination of the eigen-trajectories.

3. The non-transitory computer-readable storage medium as recited in claim 1, wherein, in said factoring 2D feature trajectories from an input video sequence, the program instructions are further executable by the one or more processors to implement applying a moving factorization technique that repeats performing factorization in a window of k frames of the input video sequence, moving the window forward b frames, and performing factorization in the moved window, where k and b are positive integers, and where k is greater than b so that the factored windows overlap.

4. The non-transitory computer-readable storage medium as recited in claim 3, wherein at least one eigen-trajectory is kept fixed when said factorization is performed in the moved window.

5. The non-transitory computer-readable storage medium as recited in claim 1, wherein said warping is performed in accordance with a content-preserving warp technique.

6. A non-transitory computer-readable storage medium comprising program instructions that, responsive to execution by one or more processors, implement a subspace video stabilization module configured to:
    apply a two-dimensional (2D) point tracking technique to an input video sequence of a scene to determine 2D trajectories of multiple scene points;
    assemble the 2D trajectories into an incomplete trajectory matrix;
    perform moving factorization to determine a time-varying subspace approximation of input motion that locally represents the incomplete trajectory matrix as eigen-trajectories representing camera motion over time and a coefficient matrix that describes each feature as a linear combination of the eigen-trajectories;
    apply an interactive spline fitting technique to the eigen-trajectories to smooth the input motion while respecting the low rank relationship of the motion of points in the scene, the interactive spline fitting enabling a user to select frames to which a quadratic or cubic spline is applied to smooth the input motion;
    multiply the smoothed eigen-trajectories that represent the smooth input motion with the coefficient matrix that describes each feature to generate a set of smoothed 2D trajectories; and
    apply a rendering technique to the input video sequence to generate a stabilized output video sequence according to the set of smoothed 2D trajectories.

7. The non-transitory computer-readable storage medium as recited in claim 6, wherein, in said applying a rendering technique to the input video sequence, the subspace video stabilization module is configured to apply a content-preserving warp technique to the input video sequence.

8. A method, comprising:
    factoring two-dimensional (2D) feature trajectories from an input video sequence into a coefficient matrix representing features in the input video sequence and eigen-trajectories representing camera motion over time in the input video sequence;

applying an interactive spline fitting technique to the eigen-trajectories effective to generate smoothed eigen-trajectories that simulate smooth camera motion;

multiplying the smoothed eigen-trajectories that simulate smooth camera motion with the coefficient matrix representing features in the input video sequence effective to generate smoothed 2D feature trajectories; and warping the input video sequence according to the smoothed 2D feature trajectories to generate a stabilized output video sequence.

9. The method as recited in claim 8, wherein the coefficient matrix describes each feature as a linear combination of the eigen-trajectories.

10. The method as recited in claim 8, wherein said factoring 2D feature trajectories from an input video sequence is performed according to a moving factorization technique that repeatedly performs the factorization in a window of k frames of the input video sequence, moving the window forward b frames, and performing factorization in the moved window, where k and b are positive integers, and where k is greater than b so that the factored windows overlap.

11. The method as recited in claim 10, wherein said moving factorization is performed according to a linear approximation technique.

12. The method as recited in claim 10, wherein at least one eigen-trajectory is kept fixed when said factorization is performed in the moved window.

13. The method as recited in claim 10, wherein said warping is performed according to a content-preserving warp technique.

14. The method as recited in claim 8, further comprising receiving selection of a quadratic spline or a cubic spline, and wherein the interactive spline fitting technique is applied to the eigen-trajectories based on the selection of the quadratic spline or the cubic spline.

15. A system comprising:
at least one processor; and
a memory comprising program instructions that, responsive to execution by the at least one processor, implement a video stabilization module;
factor two-dimensional (2D) feature trajectories from an input video sequence into a coefficient matrix representing features in the input video sequence and eigen-trajectories representing camera motion over time in the input video sequence;
apply an interactive spline fitting technique to the eigen-trajectories effective to generate smoothed eigen-trajectories that simulate smooth camera motion;
multiply the smoothed eigen-trajectories that simulate smooth camera motion with the coefficient matrix representing features in the input video sequence effective to generate smoothed 2D feature trajectories; and
warp the input video sequence according to the smoothed 2D feature trajectories to generate a stabilized output video sequence.

16. The system as recited in claim 15, wherein the coefficient matrix describes each feature as a linear combination of the eigen-trajectories.

17. The system as recited in claim 15, wherein, to factor the 2D feature trajectories, the video stabilization module is further implemented to apply a moving factorization technique that repeatedly performs the factorization in a window of k frames of the input video sequence, moving the window forward b frames, and performing factorization in the moved window, where k and b are positive integers, and where k is greater than b so that the factored windows overlap.

18. The system as recited in claim 17, wherein said factorization is performed according to a linear approximation technique.

19. The system of claim 15, wherein to apply the interactive spline fitting technique, the video stabilization module is further implemented to:
receive selection of a quadratic spline or cubic spline; and
apply the interactive spline fitting technique based on the selection of the quadratic spline or the cubic spline.

\* \* \* \* \*

UNITED STATES PATENT AND TRADEMARK OFFICE
CERTIFICATE OF CORRECTION

PATENT NO. : 8,872,928 B2  
APPLICATION NO. : 12/953703  
DATED : October 28, 2014  
INVENTOR(S) : Hailin Jin et al.

Page 1 of 1

It is certified that error appears in the above-identified patent and that said Letters Patent is hereby corrected as shown below:

In the Specification

Column 1, Line 3:
Please add the following paragraph after the Title:
--This invention was made with government support under 0416284 awarded by the National Science Foundation. The government has certain rights in the invention.--.

Signed and Sealed this
Fifth Day of January, 2021

Andrei Iancu
*Director of the United States Patent and Trademark Office*